United States Patent
Long et al.

(10) Patent No.: US 11,347,410 B1
(45) Date of Patent: May 31, 2022

(54) AUTOMATICALLY RECREATING LOST STORAGE VOLUMES

(71) Applicant: INTERNATIONAL BUSINESS MACHINES CORPORATION, Armonk, NY (US)

(72) Inventors: James Long, Rochester, MN (US); Michael James Vance, Rochester, MN (US); Justin King, Rochester, MN (US); David A. Larson Stanton, Rochester, MN (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 17/175,634

(22) Filed: Feb. 13, 2021

(51) Int. Cl.
*G06F 3/06* (2006.01)

(52) U.S. Cl.
CPC .......... *G06F 3/0619* (2013.01); *G06F 3/0629* (2013.01); *G06F 3/0644* (2013.01); *G06F 3/0664* (2013.01); *G06F 3/0673* (2013.01)

(58) Field of Classification Search
None
See application file for complete search history.

(56) References Cited

U.S. PATENT DOCUMENTS

| | | | |
|---|---|---|---|
| 2017/0075985 A1 | 3/2017 | Chakraborty et al. | |
| 2017/0220267 A1* | 8/2017 | Neelakanta | G06F 3/0688 |
| 2017/0300388 A1* | 10/2017 | Zheng | G06F 11/1464 |
| 2017/0315740 A1* | 11/2017 | Corsi | G06F 13/4282 |
| 2018/0039412 A1* | 2/2018 | Singh | G06F 13/4022 |
| 2020/0034432 A1 | 1/2020 | Jain et al. | |
| 2021/0334179 A1* | 10/2021 | Sarfare | G06F 11/2069 |
| 2021/0397524 A1* | 12/2021 | Chen | G06F 11/1474 |

FOREIGN PATENT DOCUMENTS

CN 106503231 A 3/2017

OTHER PUBLICATIONS

Xu, Y. et al., "Query Focused Multi-Document Summarization with Distant Supervision"; arXiv:2004.03027v1 [cs.CL]; (2020); 11 pgs.

* cited by examiner

*Primary Examiner* — Edward J Dudek, Jr.
*Assistant Examiner* — Ralph A Verderamo, III
(74) *Attorney, Agent, or Firm* — Intelletek Law Group, PLLC; Gabriel Daniel, Esq.

(57) ABSTRACT

A computing device, a non-transitory computer readable storage medium, and a method are provided for automatically recreating lost storage volumes. A volume command including volume metadata associated with a storage volume of an SCM storage device is received. The volume metadata is stored at another storage device that is less volatile than the SCM storage device. The storage volume is configured in accordance with the volume command including forwarding the volume command to an SCM device driver. A notification of a persistence loss at the SCM storage device is received subsequent to forwarding the volume command. The volume metadata is retrieved from the other storage device subsequent to receiving notification of the persistence loss. The storage volume is automatically re-configured in accordance with the volume command including submitting the retrieved volume metadata to the SCM device driver.

20 Claims, 3 Drawing Sheets

AUTOMATICALLY RECREATING LOST STORAGE VOLUMES

BACKGROUND

Technical Field

The present disclosure generally relates to storage devices, and more particularly, to systems and methods of automatically recreating lost storage volumes.

Description of the Related Art

Various intermediate storage solutions, including Storage Class Memory (SCM), are designed to address cost/performance alternatives between Dynamic Random-Access Memory (DRAM) and Flash memory. Generally, these intermediate storage solutions use lower latency transfer technology and are accessed/used like computer system RAM. For example, portions of intermediate storage solutions can be directly mapped into memory facilitating regular CPU read/write cycles (i.e., as part of a main page table). Advantageously, intermediate storage solutions are persistent. As such, systems using intermediate storage solutions can be rebooted/restarted more quickly (e.g., relative to Flash memory) typically with memory contents preserved.

SUMMARY

According to various embodiments of the present disclosure, a computing device, a non-transitory computer readable storage medium, and a method are provided for automatically recreating lost storage volumes.

A volume command including volume metadata associated with a storage volume of a Storage Class Memory (SCM) storage device is received (e.g., from a program or a user through a user interface). The volume metadata is stored at another storage device that is less volatile than the SCM storage device. The storage volume is configured in accordance with the volume command including forwarding the volume command to an SCM device driver.

A notification of a persistence loss at the SCM storage device is received subsequent to forwarding the volume command. The stored volume metadata is retrieved from the other storage device subsequent to being notified of the persistence loss at the SCM storage device. The storage volume is automatically re-configured in accordance with the volume command including submitting the retrieved volume metadata to the SCM device driver.

These and other features will become apparent from the following detailed description of illustrative embodiments thereof, which is to be read in connection with the accompanying drawings.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

The present disclosure generally relates to systems and methods of automatically recreating lost storage volumes. By virtue of the concepts discussed herein, a volume at a storage device can be automatically (re)created/(re)configured after a loss of persistence at the storage device.

Storage Class Memory (SCM), as well as other intermediate storage device solutions, have varying degrees of stability and may be unable to maintain persistence in certain conditions. When this occurs, (potentially all) data on the device can be lost. Loss of data can include erasure of (e.g., SCM) volumes and corresponding volume metadata. An SCM device can include a significant number of volumes (e.g., hundreds or thousands). Manually recreating and reassigning the volumes back to their partitions (e.g., virtual machines) can consume a significant amount of time. In one aspect, when an intermediate storage solution, such as, an SCM storage solution, loses persistence, volumes of the intermediate storage solution are automatically recreated.

To facilitate volume recreation, another storage solution that is less volatile (i.e., more stable) than the intermediate storage solution is utilized. In one example, Non-Volatile Random Access Memory (NvRAM)) is utilized. However, virtually any less volatile (i.e., more stable) storage solution, including any Flash memory types, can be used.

When a volume is created or modified at an intermediate storage solution, volume metadata corresponding to the volume creation or volume modification is stored at the other (less volatile, more stable) storage solution. After a loss of persistence, the stored metadata can be retrieved and used to automatically recreate volumes on the intermediate storage solution and reassign the volumes to previous partitions (e.g., virtual machines) that owned the volumes. A user or administrator need not worry about remembering and recreating previous (e.g., SCM) volume configuration. Accordingly, automatically recreating and reassigning volumes can save significant time relative to manually recreating and reassigning volumes.

In a more specific example, a request to create, modify or destroy an SCM volume at an SCM device is created via a user interface and passed down to request management software. The request can include volume metadata, such as, a volume ID (e.g., a Universally Unique Identifier (UUID)), a volume name, a volume location, a volume size, a partition (e.g., virtual machine) that owns the volume, etc. The request management software accesses (e.g., extracts) the volume metadata from the request and stores the volume metadata in less-volatile storage, such as, NvRAM. The request management software can continually update volume metadata as a user or administrator changes SCM volume configuration.

After storing the volume metadata associated with a request, the request manager can forward the request to an SCM device driver to perform the requested action (create a volume, modify a volume, destroy a volume, etc.) at the SCM device. If or when the SCM device loses persistence, the SCM device driver notifies the request management software of the loss. In response to the notification, the request manager parses the previously stored volume metadata. Using the stored volume metadata, the request manager software can automatically create/replicate one or more requests. The request manager software can send the one or more requests to the SCM device driver. The SCM device driver can implement the one or more requests to recreate and reassign volumes including transitioning the SCM device back into the configuration from prior to the loss of persistence.

Accordingly, using stored volume metadata, the request manager software can automatically recreate lost SCM volumes and automatically reassign the lost SCM volumes to partitions (e.g., virtual machines) that previously owned them. Aspects of the invention are applicable to a variety of SCM storage solutions including: non-volatile dual in-line memory module (NvDIMM), Intel Optane, 3D Xpoint, resistive RAM (RRAM or ReRAM), Magnetoresistive RAM (MRAM), Spin-transfer torque MRAM (STT-MRAM), Nanotube RAM, etc.

Aspects of the disclosure are also generally applicable to other combinations of storage solutions. Metadata associated with a more volatile (less stable) storage device can be stored at a less volatile (more stable) storage device. The stored metadata can be retrieved from the less volatile storage device and used to automatically (re)configure volumes at the more volatile storage device in response to a persistence loss at the more volatile storage device. Storage device volatility can be considered relative to how often and/or under what conditions a storage device may lose persistence. Storage devices that lose persistence more often and/or under more conditions can be considered more volatile (or less stable) relative to storage devices that lose persistence less often and/or under fewer conditions. On the other hand, storage devices that lose persistence less often and/or under fewer conditions can be considered less volatile (or more stable) relative to storage devices that lose persistence more often and/or under more conditions.

In this description and the following claims, a "partition" is defined as a group of interoperating computing resources allocated to perform a function. Different types of resources, such as, processor, memory, network, storage, etc., can be allocated to a partition. In this description and the following claims, a partition may also be referred to as "virtual machine." When computing resources are allocated to a partition or virtual machine, the partition or virtual machine can be viewed as "owning" the computing resources. For example, a partition or virtual machine can "own" a storage volume.

To better understand the features of the present disclosure, it may be helpful to discuss example architectures. To that end, FIG. 1 illustrates an example computer architecture 100 that facilitates automatically recreating lost storage volumes.

Example Architecture

Figure 1:
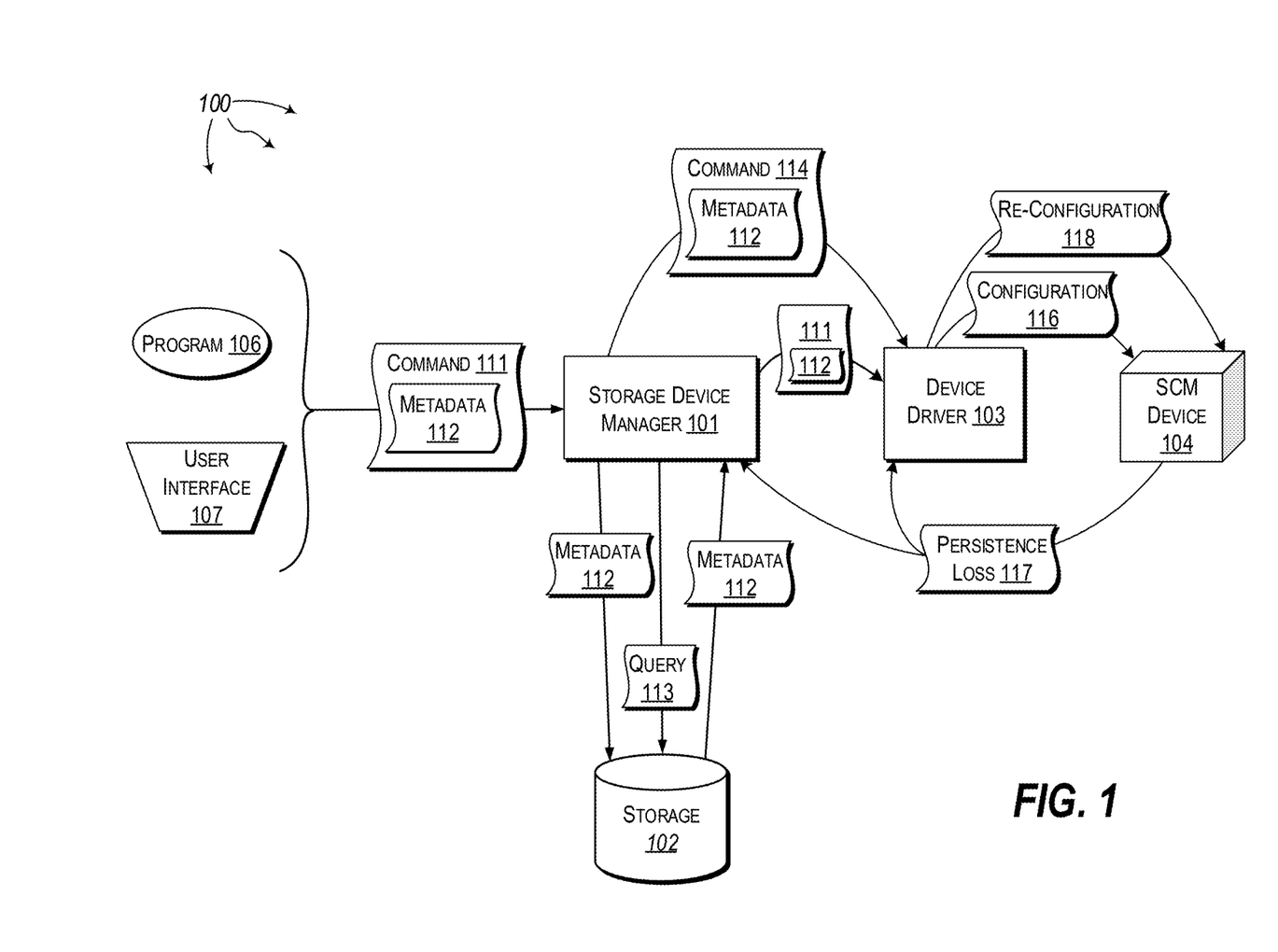
FIG. 1 illustrates an example computer architecture that facilitates automatically recreating lost storage volumes.

Reference now is made to FIG. 1, which is an example computer architecture 100 that facilitates automatically recreating lost storage volumes, consistent with an illustrative embodiment. Architecture 100 includes storage device manager 101, storage 102, device driver 103, SCM device 104, program 106, and user interface 107. Storage 102 (e.g., NvRAM) can be a less volatile (more stable) storage solution relative to SCM device 104.

In general, program 106 or a user through user interface 107 can send a volume command to change volume configuration at SCM device 104. The volume command can be directed to device driver 103. As depicted, storage device manager 101 is positioned between program 106/user interface 107 and device driver 103. Storage device manager 101 can receive the volume command prior to device driver 103.

Storage device manager 101 can extract metadata included in the volume command and store the metadata at storage 102. Storage manager 101 can then forward the volume command (including the metadata) to device driver 103. Device driver 103 can implement a volume configuration change at SMC device 104 in accordance with the volume command and included metadata.

Subsequent to implementing the configuration change, SCM device 104 may lose persistence. Persistence can be lost for a variety of reasons including firmware errors, hardware errors, sudden loss of power, capacitor discharge prior to saving data, error correction code (ECC) failures, etc. Device driver 103 can detect loss of persistence at SCM device 104 and notify storage device manager 101 of the persistence loss.

In response to the persistence loss notification, storage device manager 101 can access the extracted metadata from storage 102. Storage device manager 101 can automatically form the (previously received) volume command (or another similar volume command) from and/or including the extracted metadata. Storage device manager 101 can send the automatically formed volume command to device driver 103. Device driver 103 can implement another volume configuration change at SMC device 104 in accordance with the automatically formed volume command and extracted metadata. Implementing the other volume configuration change returns SCM device 104 to a volume configuration matching that prior to the loss of persistence.

Figure 2:
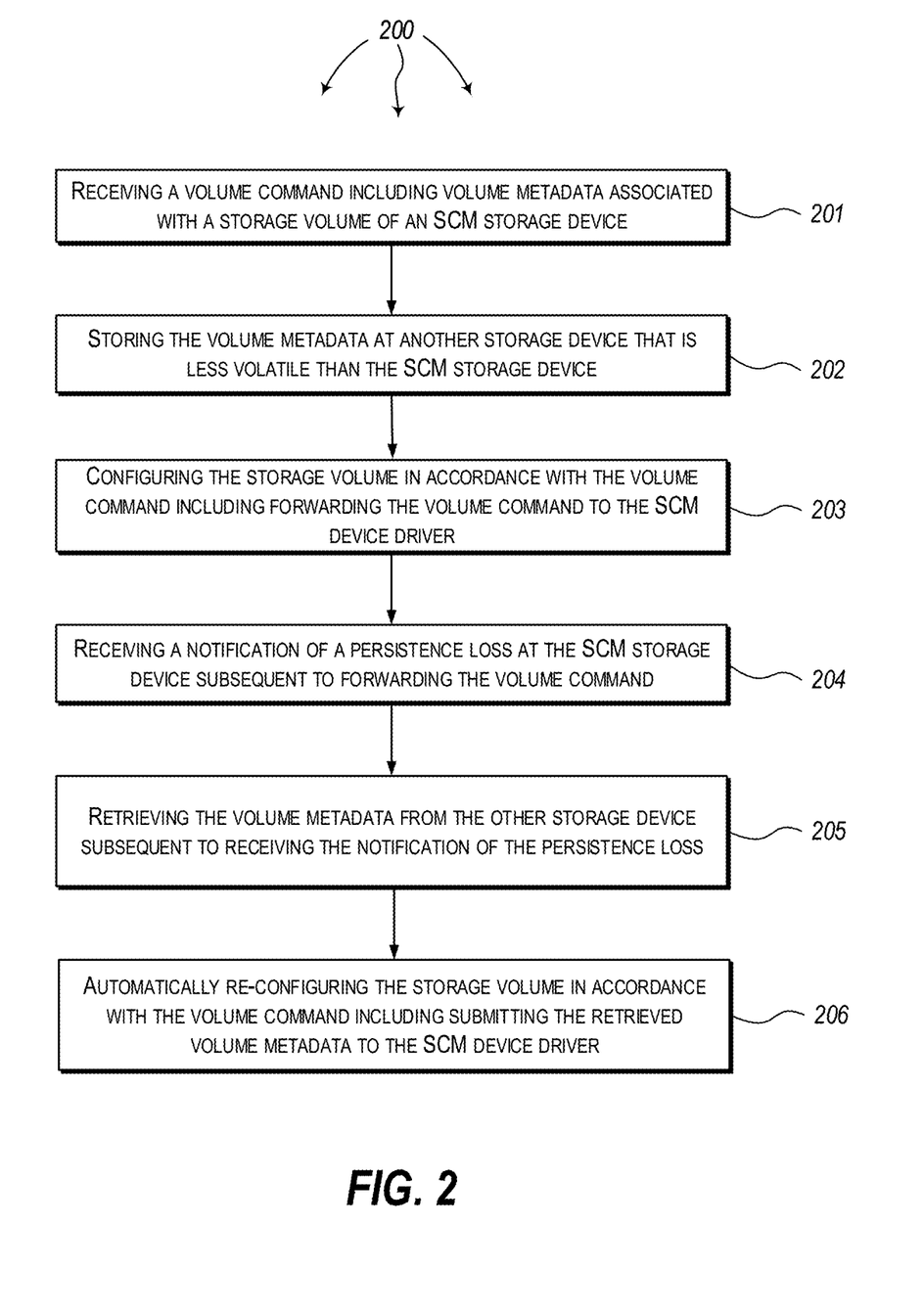
FIG. 2 illustrates a flow chart of an example method for automatically recreating lost storage volumes.

FIG. 2 illustrates a flow chart of an example method 200 for automatically recreating lost storage volumes. Method 200 will be described with respect to the components of computer architecture 100.

Method 200 includes receiving a volume command including volume metadata associated with a storage volume of an SCM storage device (201). For example, storage device manager 101 can receive command 111, including metadata 112, from program 106 or user interface 107. Metadata 112 can include for example, one or more of: a volume ID (e.g., a Universally Unique Identifier (UUID)) at SCM device 104, a volume name at SCM device 104, a volume location at SCM device 104, a volume size at SCM device 104, a partition (virtual machine) that owns a volume at SCM device 104, etc.

Method 200 includes storing the volume metadata at another storage device that is less volatile than the SCM storage device (202). For example, storage device manager 101 can extract metadata 112 from command 111 and store metadata 112 in storage 102.

Method 200 includes configuring the storage volume in accordance with the volume command including forwarding the volume command to an SCM device driver (203). For example, storage device manager 101 can send command 111, including metadata 112, to device driver 103. Device driver 103 can receive command 111, including metadata 112, from storage device manager 101. Device driver 103 can configure a storage volume at SCM device 104 in accordance with command 111 and metadata 112. For example, device driver 103 can formulate configuration 116 from command 111 and metadata 112. Device driver 103 can implement configuration 116 at SCM device 104 including, for example, one or more of: volume creation, volume modification (e.g., resizing, changing location, etc.), volume destruction, assigning a volume to a partition (virtual machine), etc.

Subsequent to implementation of configuration 116, SCM device 104 can operate as intended and in accordance with command 111 and metadata 112 for some amount of time. At some even later time, SCM device 104 may lose persistence (represented by persistence loss 117) due to for example, one or more of: firmware errors, hardware errors, sudden loss of power, capacitor discharge prior to saving data, error correction code (ECC) failures, etc., at and/or associated with SCM device 104.

Method 200 includes receiving a notification of a persistence loss at the SCM storage device subsequent to forwarding the volume command (204). For example, device driver 103 can detect persistence loss 117 at SCM device 104. Device driver 103 can notify storage device manger 101 of persistence loss 117. In another aspect, storage device manager 101 detects persistence loss 117 directly.

Method 200 includes retrieving the volume metadata from the other storage device subsequent to receiving the notification of the persistence loss (205). For example, subsequent to being notified of (or detecting) persistence loss 117, storage device manager 101 can submit query 113 to storage 102. Query 113 can be a query for metadata associated with SCM device 104. In response to query 113, storage 102 can return metadata 112 to storage device manager 101.

Method 200 includes automatically re-configuring the storage volume in accordance with the volume command including submitting the retrieved volume metadata to the SCM device driver (206). For example, storage device manager 101 can automatically form command 114 from and including metadata 112. Command 114 can be similar to (if not fully replicate) command 111. Storage device manager 101 can automatically send command 114, including metadata 112, to device driver 103. Device driver 103 can receive command 114, including metadata 112, from storage device manager 101.

Device driver 103 can configure a volume at SCM device 104 in accordance with command 114 and metadata 112. For example, device driver 103 can formulate re-configuration 118 from command 114 and metadata 112. Device driver 103 can implement re-configuration 118 at SCM device 104 including, for example, one or more of: volume creation, volume modification (e.g., resizing, changing location, etc.), volume destruction, assigning a volume to a partition (virtual machine), etc.

Subsequent to implementation of re-configuration 118, SCM device 104 can operate as intended and in accordance with command 114 and metadata 112 for some amount of time. SCM device 104's operation in accordance with re-configuration 118 can be substantially similar to (if not identical to) SCM device 104's operation in accordance with configuration 116. For example, volume configuration operations associated with command 111 can be automatically re-implemented through command 114.

In one aspect, storage 102 is utilized to store volume metadata for a plurality of other more volatile (less stable) storage devices, which may include one or more SCM devices. The plurality of storage devices can each be associated with a unique (e.g., hardware) device identifier. When user or program formulates a volume command, the user or program can include a unique device identifier in the volume command, possibly in included metadata. When a device driver (e.g., 103) notifies storage device manager 101 of persistence loss at an SCM device (or other storage device), the device driver can include a unique device identifier in the notification.

Thus, volume commands and persistence loss notifications received at storage device manager 101 can include a unique device identifier. Storage device manager 101 can utilize received unique device identifiers to distinguish metadata associated with different storage devices. For example, storage device manager can store and access volume metadata by received device identifier. Received volume commands as well as persistence loss can include/indicate a device identifier. Storage device manager 101 can use device identifiers to link received, stored, or accessed volume metadata to an appropriate more volatile (less stable) storage device. For example, storage device manager 101 can query storage 102 with a device identifier to access volume metadata associated with a storage device corresponding to the device identifier.

Figure 3:
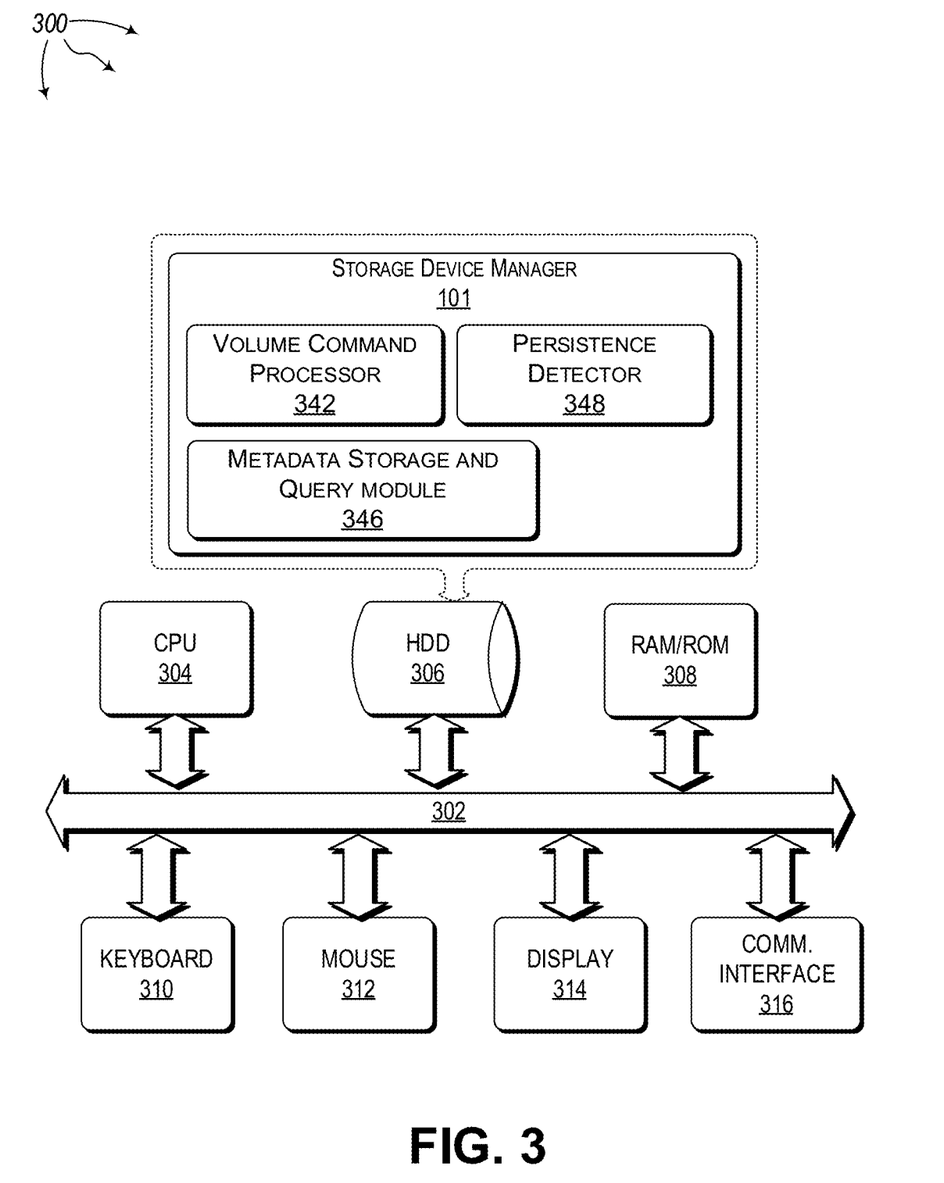
FIG. 3 illustrates a particularly configured computer hardware platform.

FIG. 3 illustrates a particularly configured computer hardware platform 300. Computer hardware platform can be used to implement a computer system including the components of computer architecture 100.

Computer platform 300 may include a central processing unit (CPU) 304, a hard disk drive (HDD) 306, random access memory (RAM) and/or read only memory (ROM) 308, a keyboard 310, a mouse 312, a display 314, and a communication interface 316, which are connected to a system bus 302.

HDD 306 can include capabilities for storing programs, such as, storage device manager 101, that are executed. Storage device manager 101 can include various modules configured to perform different functions, including volume command processor 342, metadata storage and query module 346, and persistence detector 348. Volume command processor 342 can be configured to process volume commands, including extracting volume metadata from received volume commands, forwarding volume commands to device drivers, and forming volume commands from stored metadata for use in re-configuring volumes that lose persistence. Metadata storage and query module 346 can be configured to store volume metadata at and access volume metadata from a (e.g., less volatile) storage device (e.g., by device identifier). Persistence detector 348 can be configured to monitor persistence at any of a plurality of (e.g., more volatile) storage devices and detected loss of persistence at any of the plurality of (e.g., more volatile) storage devices.

Example Operating Platform

Implementations can comprise or utilize a special purpose or general-purpose computer including computer hardware, such as, for example, one or more computer and/or hardware processors (including any of Central Processing Units (CPUs), and/or Graphical Processing Units (GPUs), general-purpose GPUs (GPGPUs), Field Programmable Gate Arrays (FPGAs), application specific integrated circuits (ASICs), Tensor Processing Units (TPUs)) and system memory, as discussed in greater detail below. Implementations also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations can comprise at least two distinctly different kinds of computer-readable media: computer storage media (devices) and transmission media.

Computer storage media (devices) includes SCM (and other intermediate storage solutions), RAM, ROM, EEPROM, CD-ROM, Solid State Drives ("SSDs") (e.g., RAM-based or Flash-based), Shingled Magnetic Recording ("SMR") devices, Flash memory, phase-change memory ("PCM"), other types of memory, other optical disk storage, magnetic disk storage or other magnetic storage devices, or any other medium that can be used to store desired program code means in the form of computer-executable instructions or data structures and that can be accessed by a general purpose or special purpose computer.

In one aspect, one or more processors are configured to execute instructions (e.g., computer-readable instructions, computer-executable instructions, etc.) to perform any of a plurality of described operations. The one or more processors can access information from system memory and/or store information in system memory. The one or more processors can (e.g., automatically) transform information between different formats, such as, for example, between any of: volume commands, volume metadata, queries, volume configurations, volume re-configurations, persistence loss notifications, persistence loss detections, etc.

System memory can be coupled to the one or more processors and can store instructions (e.g., computer-readable instructions, computer-executable instructions, etc.) executed by the one or more processors. The system memory can also be configured to store any of a plurality of other types of data generated and/or transformed by the described components, such as, for example, volume commands, volume metadata, queries, volume configurations, volume re-configurations, persistence loss notifications, persistence loss detections, etc.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that computer storage media (devices) can be included in computer system components that also (or even primarily) utilize transmission media.

Computer-executable instructions comprise, for example, instructions and data which, in response to execution at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the described aspects may be practiced in network computing environments with many types of computer system configurations, including, personal computers, desktop computers, laptop computers, message processors, hand-held devices, wearable devices, multicore processor systems, multi-processor systems, microprocessor-based or programmable consumer electronics, network PCs, minicomputers, mainframe computers, mobile telephones, PDAs, tablets, routers, switches, and the like. The described aspects may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more Field Programmable Gate Arrays (FPGAs) and/or one or more application specific integrated circuits (ASICs) and/or one or more Tensor Processing Units (TPUs) can be programmed to carry out one or more of the systems and procedures described herein. Hardware, software, firmware, digital components, or analog components can be specifically tailor-designed for (re)configuring volumes at more volatile storage devices in response to a loss of persistence. In another example, computer code is configured for execution in one or more processors, and may include hardware logic/electrical circuitry controlled by the computer code. These example devices are provided herein purposes of illustration, and are not intended to be limiting. Embodiments of the present disclosure may be implemented in further types of devices.

The described aspects can also be implemented in cloud computing environments. In this description and the following claims, "cloud computing" is defined as a model for enabling on-demand network access to a shared pool of configurable computing resources. For example, cloud computing can be employed in the marketplace to offer ubiquitous and convenient on-demand access to the shared pool of configurable computing resources (e.g., compute resources, networking resources, and storage resources). The shared pool of configurable computing resources can be provisioned via virtualization and released with low effort or service provider interaction, and then scaled accordingly.

A cloud computing model can include various characteristics such as, for example, on-demand self-service, broad network access, resource pooling, rapid elasticity, measured service, and so forth. A cloud computing model can also expose various service models, such as, for example, Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth. In this description and in the following claims, a "cloud computing environment" is an environment in which cloud computing is employed.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computing device comprising:
a processor;
a Storage Class Memory (SCM) storage device coupled to the processor;
another storage device that is less volatile than the SCM storage device coupled to the processor;
an SCM device driver managing volumes of the SCM storage device;
a storage device manager stored in the other storage device, wherein executing the storage device manager by the processor configures the computing device to perform acts comprising:
receiving a volume command including volume metadata associated with a storage volume of the SCM storage device;
storing the volume metadata at the other storage device;
configuring the storage volume in accordance with the volume command including forwarding the volume command to the SCM device driver;
receiving a notification of a persistence loss at the SCM storage device subsequent to forwarding the volume command;
retrieving the volume metadata from the other storage device subsequent to receiving the notification of the persistence loss; and
automatically re-configuring the storage volume in accordance with the volume command including submitting the retrieved volume metadata to the SCM device driver.

2. The computing device of claim 1, wherein configuring the storage volume in accordance with the volume command comprises assigning the storage volume to a partition or virtual machine.

3. The computing device of claim 1, wherein configuring the storage volume in accordance with the volume command comprises creating the storage volume.

4. The computing device of claim 1, wherein receiving a volume command including the volume metadata comprises receiving one or more of: a volume identifier, a volume name, a volume size, a volume location, or a volume owner.

5. The computing device of claim 1, wherein storing the volume metadata at the other storage device comprises storing the volume metadata at a Non-Volatile Random-Access Memory (NvRAM) device.

6. The computing device of claim 1, wherein automatically re-configuring the storage volume in accordance with the volume command comprises automatically assigning the storage volume to a partition or virtual machine.

7. The computing device of claim 1, wherein automatically re-configuring the storage volume in accordance with the volume command comprises automatically creating the storage volume.

8. The computing device of claim 1, wherein receiving a volume command comprises one of: receiving the volume command from a user interface or receiving the volume command from loading a program.

9. A non-transitory computer readable storage medium tangibly embodying a computer readable program code having computer readable instructions that, when executed, causes a user device to carry out a method of configuring a storage device, the method comprising:
receiving a volume command including volume metadata associated with a storage volume of a Storage Class Memory (SCM) storage device;
storing the volume metadata at another storage device that is less volatile than the SCM storage device;
configuring the storage volume in accordance with the volume command including forwarding the volume command to the SCM device driver;
receiving a notification of a persistence loss at the SCM storage device subsequent to forwarding the volume command;
retrieving the volume metadata from the other storage device subsequent to receiving the notification of the persistence loss; and
automatically re-configuring the storage volume in accordance with the volume command including submitting the retrieved volume metadata to the SCM device driver.

10. The non-transitory computer readable storage medium of claim 9, wherein configuring the storage volume in accordance with the volume command comprises assigning the volume to a partition or virtual machine.

11. The non-transitory computer readable storage medium of claim 9, wherein configuring the storage volume in accordance with the volume command comprises creating the storage volume.

12. The non-transitory computer readable storage medium of claim 9, wherein retrieving the volume metadata from the other storage device comprises retrieving one or more of: a volume identifier, a volume name, a volume size, a volume location, or a volume owner.

13. The non-transitory computer readable storage medium of claim 9, wherein automatically re-configuring the storage volume in accordance with the volume command comprises automatically assigning the storage volume to a partition or virtual machine.

14. The non-transitory computer readable storage medium of claim 9, wherein automatically re-configuring the storage volume in accordance with the volume command comprises automatically creating the storage volume.

15. A computer-implemented method for configuring a storage device, the method comprising:
receiving a volume command including volume metadata associated with a storage volume of Storage Class Memory (SCM) storage device;
storing the volume metadata at another storage device that is less volatile than the SCM storage device;
configuring the storage volume in accordance with the volume command including forwarding the volume command to an SCM device driver;
receiving notification of a persistence loss at the SCM storage device subsequent to forwarding the volume command;
retrieving the volume metadata from the other storage device subsequent to receiving the notification of the persistence loss; and
automatically re-configuring the storage volume in accordance with the volume command including submitting the retrieved volume metadata to the SCM device driver.

16. The computer implemented method of claim 15, wherein configuring the storage volume in accordance with the volume command comprises assigning the storage volume to a partition or virtual machine.

17. The computer implemented method of claim 16, wherein automatically re-configuring the storage volume in accordance with the volume command comprises automatically assigning the storage volume to the partition or virtual machine again.

18. The computer implemented method of claim 15, wherein configuring the storage volume in accordance with the volume command comprises creating the storage volume.

19. The computer implemented method of claim 18, wherein automatically re-configuring the storage volume in accordance with the volume command comprises automatically creating the storage volume again.

20. The computer implemented method of claim 15,
   wherein receiving a volume command including volume metadata comprises receiving one or more of: a volume identifier, a volume name, a volume size, a volume location, or a volume owner; and
   wherein retrieving the volume metadata from the other storage device comprises retrieving the one or more of: the volume identifier, the volume name, the volume size, the volume location, or the volume owner.

* * * * *